(12) United States Patent
Amado et al.

(10) Patent No.: US 7,347,945 B2
(45) Date of Patent: *Mar. 25, 2008

(54) METHOD AND AN INSTALLATION FOR SEPARATING OUT MULTIPHASE EFFLUENTS

(75) Inventors: Jul Amado, Paris (FR); Baptiste Germond, Châtenay Malabry (FR); Pierre Le Foll, Antony (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 421 days.

This patent is subject to a terminal disclaimer.

(21) Appl. No.: 10/275,016

(22) PCT Filed: Apr. 26, 2001

(86) PCT No.: PCT/EP01/04720

§ 371 (c)(1),
(2), (4) Date: May 6, 2003

(87) PCT Pub. No.: WO01/83074

PCT Pub. Date: Nov. 8, 2001

(65) Prior Publication Data

US 2004/0011748 A1    Jan. 22, 2004

(30) Foreign Application Priority Data

May 3, 2000    (FR) ................. 00 05665

(51) Int. Cl.
*B01D 17/032* (2006.01)

(52) U.S. Cl. .............. 210/739; 210/744; 210/800; 210/96.1; 210/104; 210/521; 210/540; 210/776; 210/533; 210/537; 210/539; 95/253; 95/254; 96/156; 96/182; 96/184; 166/267; 166/316; 166/75.12

(58) Field of Classification Search ........... 210/800, 210/86, 93, 96.1, 97, 103, 104, 105, 109, 210/188, 513, 532.1, 533, 538, 540; 166/267
See application file for complete search history.

(56) References Cited

U.S. PATENT DOCUMENTS

| | | | | | |
|---|---|---|---|---|---|
| 407,250 | A | * | 7/1889 | Roeske | 261/5 |
| 1,159,044 | A | * | 11/1915 | Kelly | 210/199 |
| 1,528,003 | A | * | 3/1925 | Yarnall | 137/578 |
| 2,157,405 | A | * | 5/1939 | Frey | 137/578 |
| 2,579,304 | A | * | 12/1951 | Crawford | 405/60 |
| 2,688,368 | A | * | 9/1954 | Rodgers et al. | 166/267 |
| 2,783,854 | A | * | 3/1957 | Lovelady et al. | 96/184 |
| 2,825,422 | A | * | 3/1958 | Schoenfeld | 96/159 |
| 2,870,860 | A | * | 1/1959 | Ray | 96/168 |
| 2,998,096 | A | * | 8/1961 | Snipes | 96/161 |
| 3,025,880 | A | * | 3/1962 | Anderson | 137/625.33 |
| 3,077,713 | A | * | 2/1963 | Sinex | 96/411 |
| 3,105,855 | A | * | 10/1963 | Meyers | 585/15 |

(Continued)

*Primary Examiner*—Robert James Popovics
*Assistant Examiner*—T. Woodruff
(74) *Attorney, Agent, or Firm*—James L. Kurka

(57) ABSTRACT

The invention relates to a method and to an installation for separating out an effluent made up of a multi-phase fluid mixture. According to the invention, said installation includes gravity separator means whose geometrical separation characteristics can be adjusted during said separation operation. According to the invention, the method makes it possible to adjust the geometrical separation characteristics of the separator as a function of how the multi-phase composition of the effluent varies over time.

19 Claims, 3 Drawing Sheets

U.S. PATENT DOCUMENTS

| | | | | |
|---|---|---|---|---|
| 3,394,530 A * | 7/1968 | O'Neill et al. ............... 96/159 |
| 3,396,846 A * | 8/1968 | Hamilton .................... 210/740 |
| 3,425,556 A * | 2/1969 | Völker ........................ 210/104 |
| 3,578,077 A * | 5/1971 | Glenn et al. .................. 166/68 |
| 3,672,127 A * | 6/1972 | Mayse et al. ............... 204/662 |
| 3,675,771 A * | 7/1972 | McKee ........................ 210/800 |
| 3,704,567 A * | 12/1972 | Engel ............................ 95/19 |
| 3,705,626 A * | 12/1972 | Glenn et al. ................ 166/267 |
| 3,709,292 A * | 1/1973 | Palmour ....................... 166/68 |
| 3,745,115 A * | 7/1973 | Olsen .......................... 210/776 |
| 3,759,324 A * | 9/1973 | Mecusker ................. 166/75.12 |
| 3,782,463 A * | 1/1974 | Palmour ....................... 166/68 |
| 3,802,501 A * | 4/1974 | Mecusker ................. 166/75.12 |
| 3,804,252 A * | 4/1974 | Rishel ......................... 210/800 |
| 3,884,803 A * | 5/1975 | Traylor ....................... 210/704 |
| 3,892,127 A * | 7/1975 | Cirulis et al. ............... 73/61.49 |
| 3,934,275 A * | 1/1976 | Bishton, Jr. ..................... 4/317 |
| 3,971,719 A * | 7/1976 | Peters ......................... 210/104 |
| 3,982,665 A * | 9/1976 | Frenken et al. ................ 222/67 |
| 4,055,499 A * | 10/1977 | Laxo ........................... 210/119 |
| 4,059,517 A * | 11/1977 | Strahorn et al. .............. 95/253 |
| 4,073,734 A * | 2/1978 | Lowrie .......................... 96/184 |
| 4,094,338 A * | 6/1978 | Bauer ......................... 137/578 |
| 4,233,154 A * | 11/1980 | Presley ....................... 210/800 |
| 4,304,570 A * | 12/1981 | Kleeberg et al. .......... 23/293 S |
| 4,424,068 A * | 1/1984 | McMillan .................... 95/243 |
| 4,431,536 A * | 2/1984 | Thompson .................. 210/123 |
| 4,435,196 A * | 3/1984 | Pielkenrood .................. 96/184 |
| 4,512,883 A * | 4/1985 | Thompson .................. 210/123 |
| 4,547,149 A * | 10/1985 | Chaudot ..................... 431/202 |
| 4,596,136 A * | 6/1986 | Zacharias .................. 73/61.45 |
| 4,604,196 A * | 8/1986 | Lowrie et al. ................. 96/176 |
| 4,836,017 A * | 6/1989 | Bozek ..................... 73/152.42 |
| 4,852,395 A * | 8/1989 | Kolpak ..................... 73/61.44 |
| 4,867,872 A * | 9/1989 | Russell et al. .............. 210/104 |
| 4,960,513 A * | 10/1990 | Young ........................ 210/104 |
| 5,059,312 A * | 10/1991 | Galletti ....................... 210/122 |
| 5,082,556 A * | 1/1992 | Reese ........................... 96/159 |
| 5,090,238 A * | 2/1992 | Jones ...................... 73/152.42 |
| 5,104,528 A * | 4/1992 | Christie ...................... 210/122 |
| 5,132,011 A * | 7/1992 | Ferris ........................... 96/184 |
| 5,147,534 A * | 9/1992 | Rymal, Jr. ................... 210/104 |
| 5,149,344 A * | 9/1992 | Macy ............................ 96/159 |
| 5,154,538 A * | 10/1992 | Bockle ....................... 210/104 |
| 5,186,821 A * | 2/1993 | Murphy ........................ 210/86 |
| 5,202,031 A * | 4/1993 | Rymal, Jr. ................... 210/703 |
| 5,211,842 A * | 5/1993 | Tuss et al. .................... 210/87 |
| 5,254,292 A * | 10/1993 | Gabryelczyk et al. ........ 261/76 |
| 5,290,434 A * | 3/1994 | Richard ...................... 210/109 |
| 5,302,294 A * | 4/1994 | Schubert et al. ........... 210/702 |
| 5,326,469 A * | 7/1994 | Thompson .................. 210/192 |
| 5,363,696 A * | 11/1994 | Cardellini et al. .......... 73/61.44 |
| 5,368,747 A * | 11/1994 | Rymal, Jr. et al. .......... 210/744 |
| 5,375,618 A * | 12/1994 | Giannesini .................. 137/110 |
| 5,377,714 A * | 1/1995 | Giannesini et al. ............ 137/2 |
| 5,378,353 A * | 1/1995 | Koch ............................ 210/86 |
| 5,421,357 A * | 6/1995 | Levallois ........................ 137/1 |
| 5,451,330 A * | 9/1995 | Garrett ........................ 210/776 |
| 5,494,067 A * | 2/1996 | Levallois .................... 137/154 |
| 5,535,632 A * | 7/1996 | Kolpak ..................... 73/861.04 |
| 5,601,705 A * | 2/1997 | Glasgow .................... 210/104 |
| 5,654,502 A * | 8/1997 | Dutton ..................... 73/152.18 |
| 5,661,248 A * | 8/1997 | Bernicot et al. .......... 73/861.04 |
| 5,693,218 A * | 12/1997 | Yamamoto et al. ......... 210/122 |
| 5,698,791 A * | 12/1997 | Lemaire .................. 73/861.04 |
| 5,711,338 A * | 1/1998 | Talon ............................. 137/8 |
| 5,800,700 A * | 9/1998 | Liu ............................. 210/109 |
| 5,857,522 A * | 1/1999 | Bradfield et al. ........... 166/267 |
| 5,865,992 A * | 2/1999 | Edmondson ................ 210/180 |
| 5,897,773 A * | 4/1999 | Rhodes ....................... 210/232 |
| 5,900,137 A * | 5/1999 | Homan .......................... 210/85 |
| 5,928,519 A * | 7/1999 | Homan ....................... 210/741 |
| 5,965,029 A * | 10/1999 | Simon et al. ............... 210/663 |
| 5,989,414 A * | 11/1999 | Bzorgi ........................ 210/121 |
| 6,027,641 A * | 2/2000 | Spradbury et al. .......... 210/169 |
| 6,032,539 A * | 3/2000 | Liu et al. .................. 73/861.04 |
| 6,041,668 A * | 3/2000 | Guieze et al. ............ 73/863.03 |
| 6,110,383 A * | 8/2000 | Coombs et al. ............. 210/732 |
| 6,134,951 A * | 10/2000 | Scott et al. ................ 73/61.44 |
| 6,164,308 A * | 12/2000 | Butler ............................ 137/2 |
| 6,183,654 B1* | 2/2001 | Terrien et al. .............. 210/776 |
| 6,187,079 B1* | 2/2001 | Bridger ......................... 96/179 |
| 6,196,310 B1* | 3/2001 | Knight ..................... 166/105.5 |
| 6,199,631 B1* | 3/2001 | Knight ..................... 166/105.5 |
| 6,209,651 B1* | 4/2001 | Knight ........................ 166/369 |
| 6,212,948 B1* | 4/2001 | Ekdahl et al. ............ 73/152.18 |
| 6,214,220 B1* | 4/2001 | Favret, Jr. ................... 210/188 |
| 6,216,781 B1* | 4/2001 | Knight ..................... 166/105.5 |
| 6,234,030 B1* | 5/2001 | Butler ....................... 73/861.04 |
| 6,257,070 B1* | 7/2001 | Giallorenzo et al. ...... 73/861.04 |
| 6,277,287 B1* | 8/2001 | Terrien et al. .............. 210/747 |
| 6,299,672 B1* | 10/2001 | Rivas ........................... 95/243 |
| 6,315,899 B1* | 11/2001 | Hernandez ................ 210/195.1 |
| 6,338,276 B1* | 1/2002 | Durando et al. .......... 73/861.04 |
| 6,354,318 B2* | 3/2002 | Butler ............................ 137/2 |
| 6,401,529 B1* | 6/2002 | Robison et al. .......... 73/152.19 |
| 6,402,820 B1* | 6/2002 | Tippetts et al. ............... 96/157 |
| 6,423,238 B2* | 7/2002 | Hernandez ................. 210/800 |
| 6,499,344 B2* | 12/2002 | Nelson et al. ........... 73/152.23 |
| 6,537,458 B1* | 3/2003 | Polderman ................. 210/801 |
| 6,644,514 B2* | 11/2003 | Wickins ..................... 222/185.1 |
| 6,755,255 B2* | 6/2004 | Wade et al. ................ 166/369 |
| 6,773,605 B2* | 8/2004 | Nyborg et al. .............. 210/741 |
| 6,881,329 B2* | 4/2005 | Amado et al. ............. 210/96.1 |
| 6,915,818 B2* | 7/2005 | Burris et al. ................ 137/544 |
| 6,989,103 B2* | 1/2006 | Mohsen et al. ............. 210/708 |
| 7,024,951 B2* | 4/2006 | Germond ................ 73/863.21 |
| 2003/0159986 A1* | 8/2003 | Amado et al. .............. 210/521 |
| 2003/0217956 A1* | 11/2003 | Mohsen et al. ............. 210/188 |
| 2004/0007131 A1* | 1/2004 | Chitty et al. .................. 95/253 |
| 2004/0011748 A1* | 1/2004 | Amado et al. .............. 210/800 |
| 2004/0112150 A1* | 6/2004 | Germond ................ 73/863.21 |

* cited by examiner

METHOD AND AN INSTALLATION FOR SEPARATING OUT MULTIPHASE EFFLUENTS

The invention relates to a method and an installation for separating out multi-phase effluents. A preferred application of the invention relates to separating out an effluent coming from an oil well, said effluent typically comprising three phases: an aqueous phase, a liquid hydrocarbon phase, and a gaseous hydrocarbon phase.

After a hydrocarbon well has been drilled and made safe, production is started from the well for a relatively short time in order to identify clearly the types and magnitudes of its various components, and in order to estimate the production capacities of the well. These tests, commonly referred to as "well testing", use means for separating out the various phases of the effluent (water, oil, and gas). Since the various phases are of different densities, separation takes place continuously in a vertical separator, in which the phases settle out. Downstream from the separator, the aqueous phase is discharged, optionally after undergoing additional purification, and the hydrocarbons are burnt off.

At the beginning of the testing step, a transitional stage takes place during which the composition of the effluent varies enormously. Insofar as the well is initially essentially filled with aqueous residues from the drilling fluid and from the completion fluid, the effluent that is collected is essentially made up of water. Then, gradually, the percentage of aqueous residue decreases, and the composition of the effluent becomes enriched with oil and with gas.

Since state-of-the-art separators are dimensioned to treat effluents whose phase ratio remains substantially stable over time, it is not possible to use them for the effluent during the transitional stage. Thus, a major preoccupation is to dispose of the effluent that leaves the well first.

For that purpose, a first known solution consists in sending the effluent directly to burners without any separation step being performed. Unfortunately, the burners known from the state of the art are effective only for mixtures in which the hydrocarbon content is at least 70% to 80%. As a result, when the effluent is sent directly to such burners, the environment is polluted to a relatively large extent because of unburnt hydrocarbons. That solution poses serious pollution problems and is thus unacceptable.

Another known solution consists in recovering the effluent and in storing it temporarily in containers, until the oil that it contains separates from the aqueous phase and floats on the surface of it in said containers. The oil phase is then recovered, and it is sent to the burners while the resulting cleaned aqueous phase is disposed of. Although that method gives rise to lower risks for the environment, it requires the site to be equipped with separators and additional pipes, constituting costly and voluminous equipment.

Another method consists in building an independent installation for treating effluent while its multi-phase ratio is not stable. Although that method is ecologically very satisfactory, it increases problems related to the cost of treatment installations and to the space they take up. Logistics problems are then particularly numerous.

An object of the invention is to solve the pollution problem related to removing the effluent while its multi-phase composition is varying over time, without it being necessary to collect waste which must then be treated subsequently.

To this end, the invention provides an installation for separating out an effluent made up of a multi-phase fluid mixture, said installation including gravity separator means whose geometrical separation characteristics can be adjusted during said separation operation.

By adjusting the separation characteristics during the separation operation, it is possible to treat effluent whose phase ratio is not constant over time. As a result, when used for effluent from an oil well, the separator installation of the invention makes it possible to treat said effluent throughout the testing period, including the transitional period, during which the ratios of the three phases, namely water, oil, and gas, are not stabilized.

It is thus possible to treat the effluent in the separator regardless of how the volume ratios of the various phases fluctuate as a function of time. Thus, the burners receive a mixture whose hydrocarbon content makes it possible to burn off the hydrocarbons without any discharge that is harmful to the environment, and a cleaned aqueous phase is recovered without any additional installation being necessary. The separator installation of the invention thus makes it possible to preserve the environment without it being necessary to collect waste that must then be treated by an auxiliary installation.

The invention also provides a method of separating out by gravity an effluent made up of a multi-phase fluid, said method being characterized by the fact that the geometrical separation characteristics of the separator are adjusted as a function of how the multi-phase composition of the effluent varies over time.

The method of the invention thus makes it possible to treat a multi-phase effluent whose composition is not stable over time, without giving rise to any pollution or additional cost. In particular, the method enables the effluent from an oil well to be treated continuously, without any auxiliary operations.

In an advantageous implementation of the invention, the method makes it possible to give preference selectively to different effluent phases, taken separately or in combination.

This makes it possible to act on the separation characteristics in order to give preference to the retention time of some particular phase, depending on whether a higher level of purity is desired on one or other of the phases. This is particularly advantageous if very clean water is to be obtained, e.g. so that said water can be discharged directly without polluting the environment.

The invention will be well understood on reading the following description given with reference to the accompanying drawings. The list of accompanying drawings is as follows.

Figure 1:
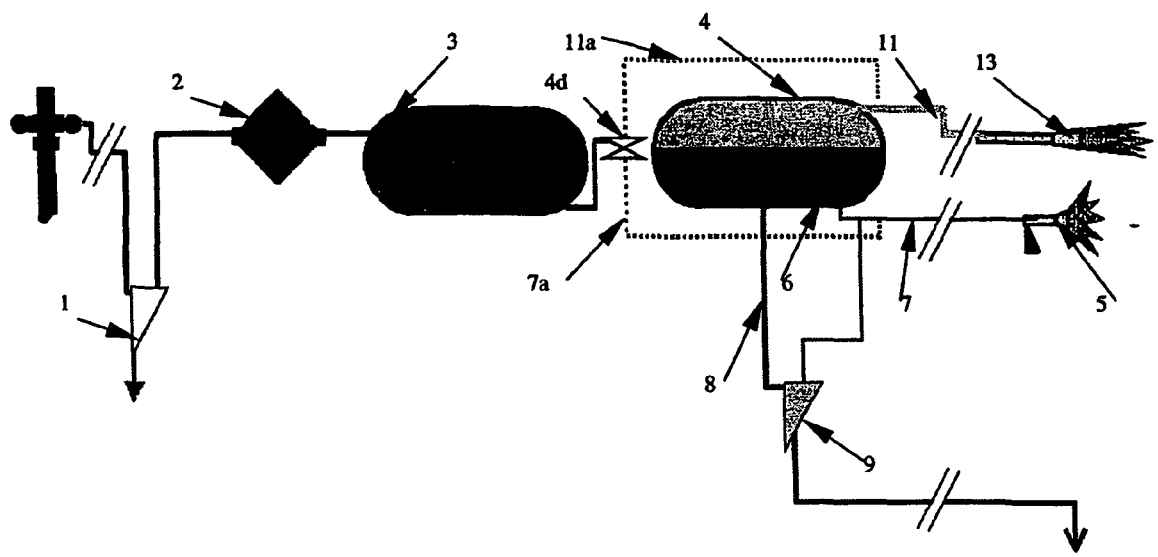
FIG. 1 is a diagrammatic view of a state-of-the-art separator installation.

FIG. 1 is a diagram showing a separator installation known from the state of the art. It is made up of a solids separator 1 followed by a pressure-reducing valve 2, by a heat exchanger 3, and then by a separator 4. Outlets from the separator 4 lead to burners 5 and 13.

The solids separator 1 makes it possible to remove solid particles in suspension in the effluent from the well. After passing through the solids separator 1, the effluent is sent to the pressure-reducing valve 2 which makes it possible to reduce the pressure of the effluent, while the heat exchanger 3 serves to heat up said effluent whose viscosity can increase as a result of the heat loss caused by expansion in the pressure-reducing valve.

The effluent is then sent to a separator 4 that is substantially in the form of a cylindrical tank whose usual capacity is about 4 cubic meters ($m^3$), such a size being compatible with separators being transported from site to site. The separator 4 operates on the principle of the various phases of the effluent settling out by gravity. In conventional manner, a separation or "weir" plate 6 is situated inside the separator 4. The plate 6 defines a first compartment for water, and a second compartment which is fed by overflow with the lower-density oil phase that floats on the aqueous phase. In commonly-used separators, the weir plate 6 is situated at about 70% of the length of the separator 4 and its height lies substantially in in the range 30%, of the height of the separator to 35% of the height thereof.

The oil phase and the water phase are recovered via respective removal ducts 7 and 8 placed at the bottom of the separator. The water can be conveyed by the duct 8 to a re-treatment, unit 9. The oil feeds a low-pressure burner 5, and the gases are conveyed from the separator 4 to a high-pressure burner 13 via a duct 11.

At the beginning of the testing operation, when drilling and consolidation have just been finished, the residues from the drilling fluid and from the completion fluid that fill the well leave the well first, before any contents from the hydrocarbon deposit itself. The composition of the effluent is thus absolutely unrepresentative of the fluids from the formation and, in addition, the proportions of the various phases vary considerably over quite a short time.

The size of the separators is necessarily limited because they need to be transportable from site to site. Because of the volumes of effluent produced (about 2000 $m^3$ per day), such a limited size requires the effluents to remain in the separators for a relatively short time, typically about one minute. However, to obtain proper separation, it is necessary for that volume of the separator which is dedicated to the oil phase to make longer retention times possible.

Unfortunately, during the initial stage of the testing operation, the water-to-oil ratio is inverted. If the water draw-off is increased considerably to compensate for that ratio, the effectiveness of the separator is then reduced considerably, the water recovered then being highly contaminated with oil. If the draw-off is maintained constant, the water level rises over the weir plate, and the "oil" phase in fact contains a very large proportion of water, which makes it unsuitable for being disposed of by being burnt off, since conventional burners burn a portion only of the hydrocarbons if they are fed with a fluid whose water content is greater than 30%. The problem is the same or even more critical if the separator is by-passed by an oil by-pass line 7a or by a gas by-pass line 11a.

That state-of-the-art separator installation thus gives rise to high environmental pollution, unless all of the effluents are recovered and then re-treated off-site, which raises other safety and logistics problems, in particular related to transporting the effluents, and is clearly very costly.

For the purpose of separating out an effluent made up of a multi-phase fluid mixture, the installation of the invention includes gravity separator means whose geometrical separation characteristics can be adjusted during said separation operation.

Figure 2:
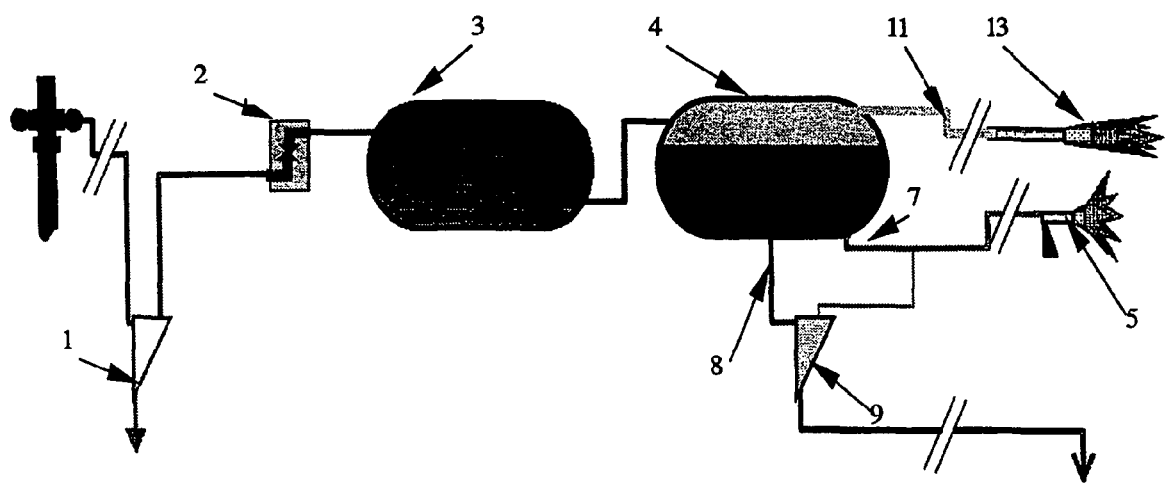
FIG. 2 is a diagrammatic view of an embodiment of a separator installation of the invention.

FIG. 2 shows an embodiment of a separator installation of the invention. The installation uses the same elements as those described above in the description of the state of the art, but it does not have any by-pass valves at the inlet of the separator 4.

A turbidity sensor is placed on the aqueous phase removal duct, while a sensor on the removal duct 7 makes it possible to determine the percentage of water in the oil leaving the separator 4.

Figure 3:
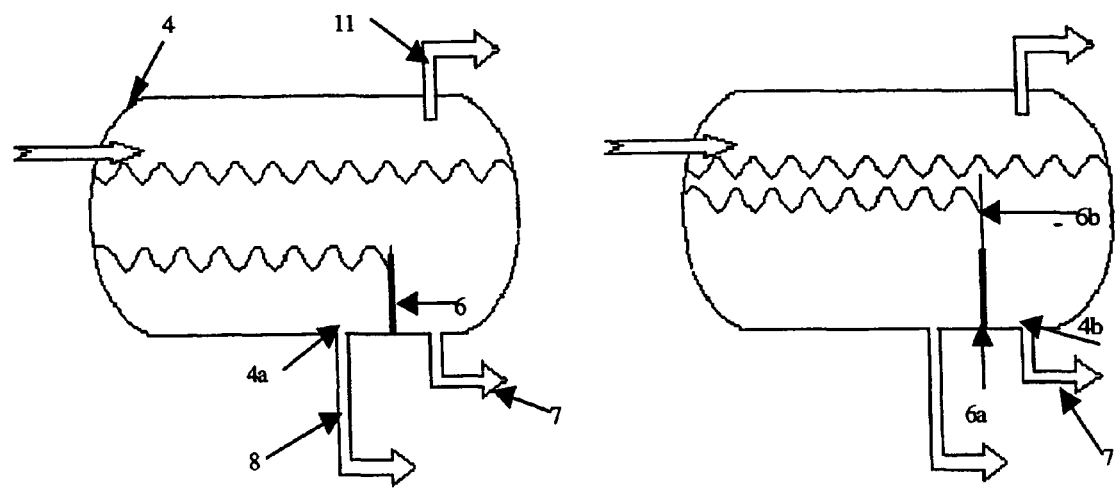
FIG. 3 is a view of a separator in another embodiment of an installation of the invention.

FIG. 3 shows an embodiment of a separator 4 in a separator installation of the invention. This separator 4 is of the type in which the phases settle out by gravity. By way of example, this separator 4 is substantially cylindrical in shape, and is the size of a tank that is transportable by truck.

The separator 4 can treat effluent whose characteristics are as follows:

At the beginning of the transitional stage, the effluent contains a very small proportion of gaseous hydrocarbons. The majority of the separator must therefore be dedicated to separating the liquid-liquid phase, while the space left for the gas phase can be minimized. In addition, most of the liquid-liquid phase is itself made up essentially of water, very little oil being supernatant on said phase.

At the end of the transitional stage and during the separation stage, the effluent is made up mostly of oil and of gas. In contrast, the percentage of water in the effluent is reduced considerably. It is thus necessary to maximize the space available in the separator for the oil phase and then for the gas phase.

The separator of the separator installation of the invention makes it possible to satisfy these requirements. The geometrical separation characteristics of the separator 4 are adjustable as a function of the composition of the effluent. Thus, however the volume ratios of the various phases of the effluent vary over time, the separator adapts itself continuously to match said ratios in order to separate out said phases by density difference.

Figure 4:
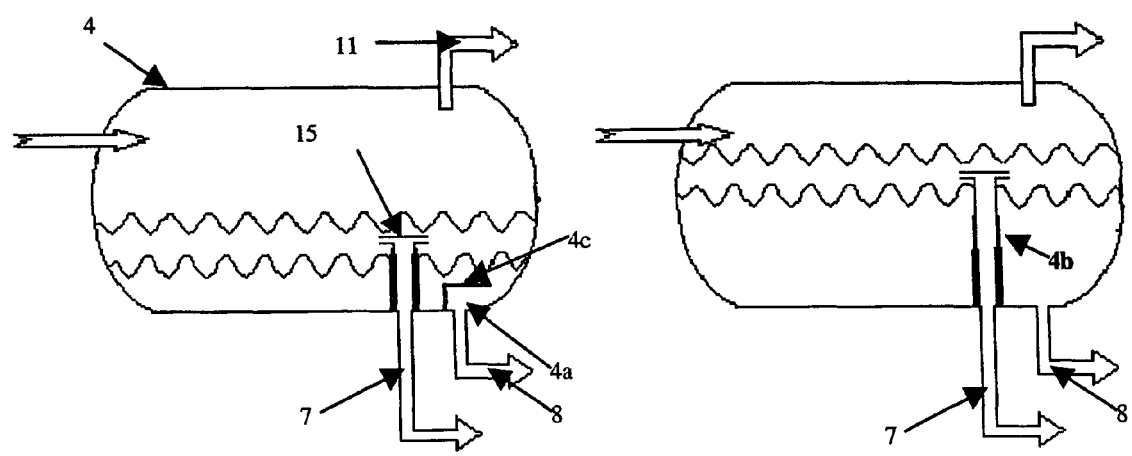
FIG. 4 is a view of a separator in another embodiment of an installation of the invention.
Figure 5:
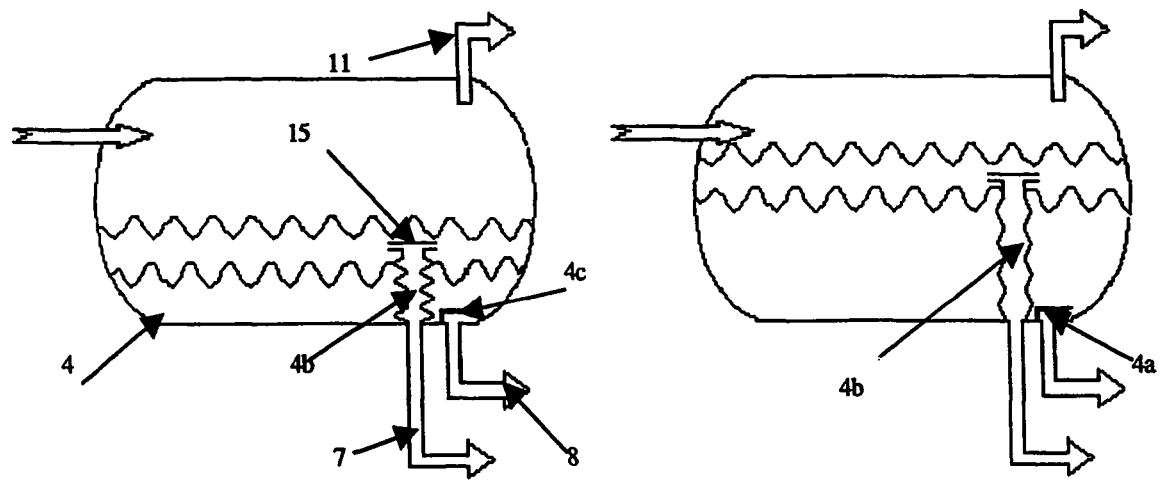
FIG. 5 is a view of a separator in another embodiment of an installation of the invention.

Embodiments of a separator of the invention are shown in FIGS. 3 to 5. FIG. 3 shows an embodiment of a separator 4 provided with a separation or "weir" plate 6 whose height is adjustable as a function of the composition of the effluent. The weir plate 6 is made up of a support 6a and of various telescopic leaves 6b which can be deployed vertically towards the top of the separator 4.

The leaves 6b can thus be deployed gradually so as to form a weir plate of variable height. Separation is performed, as known from the state of the art, by causing the oil phase to flow over the weir plate 6. As a result, the further the telescopic weir plate is deployed, the higher the maximum possible level of water and the longer the retention time for which the effluent is retained in the separator.

A removal duct 8 for removing the aqueous phase is situated upstream from the telescopic weir plate. A recovery duct 4a connected to said removal duct 8 is situated at the bottom portion of the separator. The aqueous phase is then optionally sent to a water re-treatment installation that is known per se.

An oil removal duct 7 is situated downstream, on the other side of the telescopic weir plate 6. A hydrocarbon recovery duct 4b connected to the removal duct 7 is also situated in the bottom portion of the separator 4.

In addition to adjusting the weir plate, it is also possible to adjust the flow rate of the water sent to the removal duct 8 so that the level of the liquid phases does not exceed the height of the telescopic weir plate 6. Similarly, the flow rate of oil sent to the burner 5 can be regulated so that, inside the separator, said oil can always flow away by flowing over the telescopic weir plate 6.

Typically, at the start of the transitional stage, since the percentage of water in the effluent is particularly high, the weir plate is at its maximum height. This geometrical characteristic of the separator, together with the regulation of the flow rate of water flowing towards the treatment installation guarantees maximum water retention time and therefore particularly effective separation of the water and oil phases.

Thereafter, the percentage of water in the effluent decreases, while the percentage of oil therein increases. Thus, the capacity of the compartment dedicated to water, i.e. the height of the telescopic weir plate 6, is gradually reduced.

FIG. 4 shows another embodiment of a separator in a separator installation of the invention. In this embodiment, both the water phase and the oil phase can thus extend over the entire length of the separator 4. This solution makes it possible to increase the water retention capacity of the separator 4.

The recovery duct 4a for recovering the aqueous phase is situated at the bottom portion of the separator 4, substantially at its end remote from the inlet duct via which the effluent is fed into said separator. In this way, said recovery duct 4a is situated in a zone in which the two liquid phases of the effluent are well separated. In order to avoid any turbulence, which would hinder separation of the liquid phases, a baffle 4c can be placed immediately above the water recovery duct 4a, for example.

The removal duct 7 for removing the oil phase is also situated at the bottom portion of the separator 4. A recovery duct 4b is connected to said removal duct 7. The recovery duct 4b is made up of a telescopic tube comprising coaxial cylinders that are capable of moving progressively relative to one another in a vertical direction inside the separator 4. The recovery duct 4b is terminated by a suction intake or "collector" 15 placed substantially in the middle of the oil phase.

FIG. 5 shows a preferred embodiment of a separator in a separator installation of the invention.

In this embodiment, the recovery duct 4b for recovering the oil is constituted by a bellows of substantially cylindrical shape and made of flexible materials such as plastics materials. For reasons of compactness related to the materials of the bellows 4b in the embodiment described, the bellows can extend over 30% of the height of the separator 4, whereas, once it is totally expanded, the bellows has a height representing substantially 65% of the height of said separator 4. A suction intake or "collector" 15 is situated at the end portion of the bellows 4b.

The use of a flexible bellows offers numerous advantages: it is a lightweight and low-cost system that, in addition, does not suffer from the sealing and sliding problems encountered with a telescopic deployment system. Advantageously, a guide device is provided that is constituted, for example, by four guide stakes.

The recovery duct 4b is actuated by any type of device known in the art, in particular a pneumatic, electrical, or hydraulic actuator device.

By means of the separator 4 described both in this preferred embodiment and also in the preceding embodiments, by means of a regulation loop for regulating the height of the bellows (or of the telescopic means in the other embodiments), and by means of regulating the flow rates of the aqueous phase and of the oil phase at the outlets of the separator, it is possible to adapt the separator installation to match any effluent composition throughout the testing stage. Whatever the three-phase ratio of the effluent, by adjusting its geometrical characteristics such as the height of the weir plate or the height of the recovery duct 4b, it is possible for the separator to treat the effluent effectively.

In addition, by not fundamentally changing the component parts of a separator installation known from the state of the art, the separator installation of the invention is particularly low-cost and easy to make.

Finally, by regulating the height at which the oil is drawn off (or the height of the overflow), it is also possible to cause the retention times for which the effluent is retained in the separator to vary, and thus to optimize said retention times so as to guarantee that that water obtained at the outlet of the separator installation is almost pure, and all of the hydrocarbons are burnt off by the flares.

As indicated above, the regulation of the positioning of the weir leaves, or of the recovery duct 4b, and the adjustment of the flow rates of the water and of the oil sent to the removal ducts 7 and 8 are servo-controlled by a regulation loop whose principle is described with reference to FIG. 6.

Insofar as the separator installation of the invention makes it possible to adjust the geometrical characteristics of the separation throughout said separation, the height of the weir plate or of the oil recovery duct 4b adapts itself to changes in the composition of the effluent fed into the separator. An automatic regulation method is thus put in place, on the basis of data collected at the inlet and at the outlets of the separator.

The principle of this regulation method is based on the following points:

sufficient separator volume must be allocated to each phase so as to obtain effective retention times for each of the phases; and the sum of the heights of all of the phases is necessarily not more than the total height of the separator.

Optimizing the separation method thus consists in finding the optimum ratio for each of the phases whatever the proportions of said phases in the effluent leaving the well, while guaranteeing retention times that are sufficient to ensure that the various phases of the effluent are separated out as effectively as possible.

The allocation of the volumes in the separator 4 is determined by the importance given to one or other of the phases, and also by the flow rates of said phases.

This allocation can be performed in various ways:

it can be decided to give each phase equal importance, and the volume of the separator is then distributed equally between the three phases;

it is also possible to act on the method in order to give preference to one or other of the phases; and finally, it is possible to determine the volumes of the phases automatically on the basis of separator outlet parameters such as the proportion of water in the oil, and the proportion of oil in the water.

The proportions of the separator 4 allotted to each phase are initialized. A verification loop for verifying the overall height of the liquid phase and the height of the interface between the two liquid phases, namely water and oil, makes it possible to adjust these levels continuously and also to determine their positions in the separator accurately.

On the basis of this data, the position of the oil recovery duct 4b is adjusted optimally.

Figure 6:
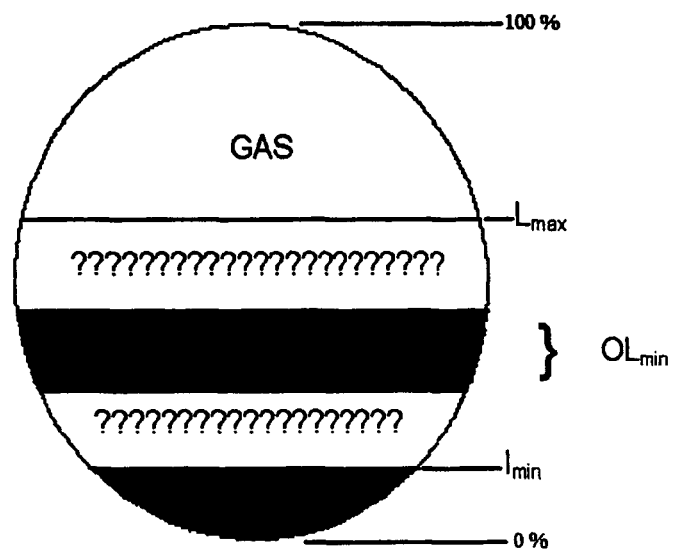
FIG. 6 is a diagram illustrates the principle whereby the separation method of the invention is regulated.

As shown in FIG. 6, gas needs a certain through section in order to eliminate droplets of liquid in suspension before the gas reaches the gas removal duct. This minimum space determines the maximum space that can be occupied by the liquid phases, which space is referenced $L_{max}$ herein. A first calculation loop makes it possible to determine the value of $L_{max}$. This loop takes account of the dimensions of the separator, the pressure inside said separator, and the flow rate of the gas phase at the outlet of the separator.

The liquid retention times are set by default for water and for oil. A second calculation loop determines the minimum depth or "height" of water that corresponds to two minutes of retention, this height being referenced $I_{min}$. This calculation loop takes account of the water flow rate at the outlet of the separator, the water retention time, and the dimensions of the separator.

The calculation loop then compares the obtained $I_{min}$ level with a reference $I_{min}$ level that is input previously. When the calculated $I_{min}$ is less than the reference $I_{min}$, the reference $I_{min}$ value is retained. Otherwise, the calculated $I_{min}$ value is retained. In this implementation, for practical dimensioning reasons, a reference $I_{min}$ value is chosen that represents about 10% of the total height of the separator.

A third calculation loop determines the minimum oil height corresponding to the retention time given by default, which height is referenced $OL_{min}$. This calculation loop takes account of the oil flow rate at the outlet of the separator, the oil retention time, and the dimensions of the separator.

The calculation loop then compares the obtained $OL_{min}$ level with a reference $OL_{min}$ level that is input previously. When the calculated $OL_{min}$ is less than the reference $OL_{min}$, the reference $OL_{min}$ value is retained. Otherwise, the calculated $OL_{min}$ value is retained. In this implementation, for practical dimensioning reasons, a reference $OL_{min}$ value is chosen that represents about 10% of the total height of the separator.

Logically, the three-phase separator must therefore satisfy the equation determining its operational envelope:

$$I_{min}+OL_{min}\frac{3}{4}L_{max}$$

The free space in the separator is allocated between one, two, or three phases, as a function of the nature of the effluent and as a function of the priority that is to be given to it in the separation.

A first possibility consists in giving preference to isolating one or other of the phases of the effluent;

When preference is to be given to the aqueous phase, all of the free space in the separator is allocated to the water. In which case, the water retention time is increased. The data in the separator is then as follows:

$$I_{sp}=L_{max}-OL_{min}$$

where $I_{sp}$ is the level of the interface between the two liquid phases.

In which case, the level of the liquid phases ($L_{sp}$) is:

$$L_{sp}=L_{max}$$

Similarly, if priority is given to the oil phase, the retention time of the oil phase is maximized, without interfering with the other phases. In which case: $I_{sp}=I_{min}$ and $L_{sp}=L_{max}$.

Finally, if preference is given to the gas phase, the operating points are as follows: $I_{sp}=I_{min}$ and $L_{sp}=I_{min}+OL_{min}$.

Otherwise, it is possible to give preference simultaneously to both of the liquid phases, namely the water and the oil. The available space is then distributed between those two phases by maintaining their characteristics in terms of retention times and separator outlet flow rates. The height of the interface between the two phases is thus calculated as a function of these operating characteristics.

In another possibility, when preference is given to the oil and gas phases, the available space in the separator is distributed equally between those two phases. The same applies if preference is given to the water and oil phases. Finally, when none of the phases are given any particular preference, one third of the space that is still available in the separator is allotted to the gas phase while the remainder is allocated to the two liquid phases.

After the operating points of the separator have been determined, the separation method of the invention is regulated by taking account of measurements performed by the turbidity sensor on the water removal duct, and by the water detector on the oil removal duct. On the basis of these measurements, three coefficients are assigned respectively to the water, the oil, and the gas phases. The coefficients serve to weight the calculations of the height of the liquid surface level in the separator and the height of the interface between the two liquid phases.

On the basis of this data, the method of regulating the installation of the invention adjusts the geometrical characteristics of the separator, i.e. the height of the weir plate or the positioning of the collector. This algorithm starts from the previously-calculated values for $I_{sp}$ and $L_{sp}$. Then the algorithm positions the collector (or the weir plate) centrally between the two values $I_{sp}$ and $L_{sp}$. Then the algorithm regulates the position of the collector. For this purpose, it takes the value given by the purity tester on the oil removal duct and compares it with arbitrary values for percentages of water in the oil (which values are always compatible with the capacities of the burner), e.g. 25% and 20%.

When the percentage of water in the oil is greater than 25%, the device for actuating the recovery duct or the weir plate is triggered so as to increase the height of said collector, e.g. up to 5% below $L_{sp}$. Then the algorithm loops back to comparing the water-in-oil percentage data with the reference values. When the water content in the oil is less than 20%, the actuating device is triggered to lower the collector to 5% above $I_{sp}$.

In this way, the regulation method of the invention makes it possible to adjust the geometrical separation characteristics of the separator continuously during separation. These characteristics are adjusted such that the percentage of water in the oil sent to the burners always lies in the range 20% to 25%, which also makes it possible to minimize the quantity of water to be discharged or to be treated.

The installation and the method of the invention are thus particularly effective for separating an effluent whose multiphase ratio varies over time. Said effluent is thus treated effectively without polluting the environment, and without it being necessary to store untreated waste.

The separation method of the invention makes it possible to omit the by-pass valves that are disposed at the inlets of state-of-the-art separators. Continuity is thus achieved in the separation method.

Finally, the separation method of the invention makes it possible to reduce the cost of treatment by making it unnecessary to provide a separate re-treatment installation for the effluent during the transitional stage or to provide settling containers for said transitional stage.

The invention claimed is:

1. An installation for separating out an effluent made up of a multi-phase fluid mixture, said installation comprising:
    a gravity separator wherein phases of the multi-phase fluid mixture segregate under the influence of gravity into a water phase, an oil phase and a gas phase into respective spaces of the separator;

respective removal ducts for each separated fluid phase, said removal ducts being connected to respective outlets of the gravity separator for each separated fluid phase;

wherein said gravity separator comprises a recovery duct comprising a suction intake at a first end and a second end operably connected and in fluid communication to one of said removal ducts said recovery duct comprising adjustment means for adjusting the length between said first and second ends of said recovery duct a such that the respective spaces for each separated fluid phase are modified during use as a function of a composition of the effluent and to position said suction intake substantially in the middle of said separated oil phase; and wherein the flow rate of at least one fluid phase in one of said removal ducts can be adjusted during said separation operation.

2. An installation according to claim 1, wherein each of said removal ducts is provided with means for measuring the residual percentage of the phase separated therefrom.

3. The installation according to claim 1, wherein the adjustment means comprise a flexible bellows that can be deployed in a vertical direction in the gravity separator during the separation step in said gravity separator.

4. The installation of claim 1, wherein said adjustment means is selected from the group consisting of coaxial tubes, coaxial cylinders, or flexible bellows.

5. The installation of claim 1, further comprising means for regulating the flow rates of the aqueous phase and of the oil phase at the outlets of the separator for adapting the installation to treat effectively any variable effluent compositions during testing of a well.

6. A method of separating out by gravity an effluent made up of a multi-phase fluid, said method comprising:
 feeding said multi-phase effluent into gravity separator,
 separating the multi-phase fluid by gravity inside said separator into a water phase, an oil phase and a gas phase into respective spaces of the separator, said gravity separator comprising respective outlets for each separated fluid phase;
 removing from said gravity separator each separated fluid phase by way of respective removal ducts; said removal ducts being connected to respective outlets of the gravity separator;

wherein said gravity separator comprises a recovery duct comprising a suction intake at a first end and being operably connected at a second end in fluid communication to one of said removal ducts said recovery duct comprising adjustment means for adjusting the length between said first and second ends of said recovery duct such that the respective spaces are modified during the separation step as a function of a composition of the effluent and to position said suction intake substantially in the middle of said oil phase; and wherein the flow rate of at least one of said fluid phase in one of said removal ducts can be adjusted as a function of how the multi-phase composition of the effluent varies over time.

7. A method according to claim 6, wherein said method makes it possible to give preference selectively to different fluid phases, taken separately or in combination.

8. A method according to claim 7, wherein the gravity separator is a vessel comprising a bottom wall and a top wall and wherein separation of the phases of the multi-phase fluid in the gravity separator under the influence of gravity defines at least two operating characteristics that are:
 the height of the liquid surface ($L_{sp}$) which corresponds to the height of all the liquid phases taken from the bottom wall of the gravity separator; and
 the height of the liquid interface ($I_{sp}$) which corresponds to the height of the interface between the liquid phases inside said gravity separator (4) taken from the bottom wall of said gravity separator.

9. A method according to claim 8, further comprising the step of:
 allocating to each phase of the multiphase fluid a certain proportion of the volume of the gravity separator;
 measuring the flow rates of the liquid phases at the outlets of the gravity separator in order to initialize values for the operating characteristics $I_{sp}$ and $L_{sp}$.

10. A method according to claim 9, wherein the multiphase fluid comprises three phases that are water, oil and gas.

11. A method according to claim 10, wherein when allocating proportions of the volume of the gravity separator to said phases, majority of said volume is given to the two liquid phases and the calculation of the height of the interface ($L_{sp}$) between said liquid phases is initialized by taking account of the retention times of said liquid phase in the gravity separator and flow rates of said phases at the outlets of the gravity separator (4).

12. A method according to claim 10, further comprising the step of:
 adjusting the position of the adjustment means of the gravity separator in order to place them between the two initialized values for $I_{sp}$ and $L_{sp}$;
 measuring the percentage of water at the oil outlet of the gravity separator;
 comparing said measured water in oil value to a maximum and a minimum arbitrary values for percentages of water in the oil;
 readjusting the position of the adjustment means of the gravity separator to a given percentage below $L_{sp}$ when said percentage of water in the oil is greater than the maximum arbitrary value or to a given percentage above $I_{sp}$ when the said percentage of water in oil is less than the minimum arbitrary value.

13. A method according to claim 9, wherein the allocation of the volumes in the gravity separator is determined by a preference given to any of the phases of the multi-phase fluid, and also by the flow rates of said phases, said flow rates being measured at the respective outlets of the gravity separator for each of said phases.

14. A method according to ciaim 13, wherein each phase is given equal preference, and die volume of the gravity separator is then distributed equally between the three phases.

15. A method according to claim 6, further comprising measuring, at the outlets of the separator the percentage of the oil phase in the water phase that flows through the water outlet of the gravity separator and of the percentage of the aqueous phase in the oil phase that flows through the oil outlet of the gravity separator in order to assign a weighting coefficient to each phase.

16. A method according to claim 15, wherein a regulation loop for regulating the operating characteristics adjusts the values of said operating characteristics throughout said separation method by taking account of the weighting coefficients of each phase.

17. A method according to claim 16, wherein said distance between said first end and second end of said recovery duct is adjusted as a function of the values of the operating characteristics.

18. A method according to claim 6, wherein the adjustment means comprise a flexible bellows that can be deployed in a vertical direction in the gravity separator during the separation step in said gravity separator.

19. An installation for separating out an effluent made up of a multi-phase fluid mixture, said installation comprising:

a gravity separator wherein phases of the multi-phase fluid mixture segregate under the influence of gravity into a water phase, an oil phase and a gas phase into respective spaces of the separator;

respective removal ducts for each separated fluid phase, said removal ducts being connected to respective outlets of the gravity separator for each fluid phase;

a flexible bellow comprising a first end having a suction intake and a second end operatively connected to one of said respective outlets; and adjustment means for expanding or contracting said bellows so that said suction intake is positioned within the separated oil phase and for modifying said respective spaces of the separator during use as a function of a composition of the effluent.

* * * * *